United States Patent Office 3,654,238
Patented Apr. 4, 1972

3,654,238
PROCESS FOR THE PREPARATION OF POLYAMIDE-SULPHOXIDE
Sebastiaan E. M. Kooijman, Geleen, and Jozef A. Thoma, Sittard, Netherlands, assignors to Stamicarbon N.V., Heerlen, Netherlands
No Drawing. Continuation-in-part of application Ser. No. 647,906, June 22, 1967. This application July 14, 1969, Ser. No. 841,598
Claims priority, application Netherlands, July 12, 1968, 6809969
Int. Cl. C08g 20/38
U.S. Cl. 260—78 A         6 Claims

ABSTRACT OF THE DISCLOSURE

Polyamide sulphoxides are prepared by oxidizing polyamides composed of monomer units having the formula [—NH—CO—$(CH_2)_2$—S—$(CH_2)_3$—] with an aqueous solution of hydrogen peroxide at about room temperature. Polyamide articles which have been treated according to the process of the present invention have been found to have substantially reduced surface charge.

---

This application is a continuation-in-part of our earlier copending application Ser. No. 647,906, filed June 22, 1967.

The invention relates to a process for the preparation of polyamidesulphoxide.

The present invention relates to a process for the oxidation of polyamides to polyamide-sulfoxides. According to the present invention, polyamides having the formula [—NH—CO—$(CH_2)_2$—S—$(CH_2)_3$—]$_n$ where $n$ represents the number of monomer units in the polyamide, having a film and filament forming molecular weight are oxidized with an aqueous solution of hydrogen peroxide at room temperatures to form the polyamide-sulfoxides of the present invention.

Thus far, polyamide-sulphoxides have not been described in the literature. The literature does contain references, however, to polyamide-sulphones, which are prepared by oxidation of thioether-polyamides with the aid of hydrogen peroxide in a highly concentrated aqueous solution of formic acid or one of the other lower fatty acids (British patent specification 670,177).

When subjecting the initial polyamides of the present invention to a treatment with hydrogen peroxide in the said known way only small amounts or nothing of polyamide-sulphones are obtained. The oxidation in that way however yields sulphonated decomposition products so that the valuable polyamide is lost by this treatment.

According to the present invention however by the treatment with hydrogen sulphoxide groups are formed in the polyamide molecules.

In one embodiment of the present invention, articles, such as for example filaments, yarns, films, sheets, rods, tubes etc. which are made of polyamide having the indicated formula are oxidized according to the process of the present invention so that only the sulphur atoms at the surface of the article are oxidized to sulfoxide groups. The resulting oxidized polyamide articles have hydrophilic properties which substantially decrease the formation of static charge on the surface of the article.

In the oxidation according to the invention, sulphur atoms contained in the polyamide are oxidized to SO- groups. According to one embodiment of the present invention, the oxidation is continued until all the sulphur atoms or the greater part thereof has been oxidized to sulphoxide groups. The polyamide thus oxidized can be dissolved in water. The water contained in the aqueous solution obtained in the said oxidation can be removed by evaporation, as a result of which polyamide-sulphoxide is left.

The polyamide-sulphoxide can, for instance together with lactam-polyamide, other types of nylon, or other polymer products, be spun to filaments, from which fabrics can be made. It is also possible to produce other objects, such as films, sheets, rods or tubes.

In another embodiment of the process of the present invention not all of the sulphur atoms contained in the polyamide, but only part thereof, for example 5–45% of the sulphur atoms, are oxidized to sulphoxide groups by controlling the duration of the oxidation treatment, which may vary from a few seconds to a few hours, and the concentration of the aqueous solution of hydrogen peroxide, which usually contains 2–40% by weight of hydrogen peroxide so that the required degree of oxidation is obtained.

Thus the polymer of the present invention can be substantially entirely composed of monomer unit having the formula

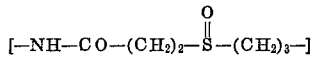

or it can contain a mixture of, for example, 5–45 weight percent of the above shown sulphoxide monomer and the balance unoxidized sulphide monomer.

The process according to the invention is effected at room temperature of about 10–30° C. If use is made of higher temperatures, decomposition products containing sulphonic acids will be formed. In the oxidation according to the invention in the indicated temperature range no decomposition takes place.

EXAMPLE I

A piece (length and width 70 mm., thickness 4 mm.) of polyamide sheet comprising a polymer wherein the monomer units have the formula

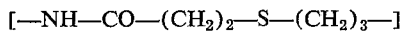

produced according to our earlier copending application Ser. No. 647,906 filed on June 22, 1967, the disclosure of which is hereby incorporated by reference, was immersed in 150 cc. of an aqueous solution of hydrogen peroxide (30 $H_2O_2$ percent by weight) at a temperature of 20° C. The melting temperature of the polyamide was 200° C. and the intrinsic viscosity, measured in metacresol at 25° C., was to 1.5.

After 2½ hours the polyamide was dissolved. The excess of hydrogen peroxide was decomposed by addition of 2 g. of palladium-carbon catalyst. Upon filtration, the water was evaporated from the solution.

The polyamide-sulphoxide (melting temperature 195° C.) had an unchanged intrinsic viscosity of 1.5. The molecular structure was determined by optical analysis.

EXAMPLE II

The procedure described in Example I was repeated, with the difference that use was made of 150 cm.³ of a 5% by weight aqueous solution of hydrogen peroxide.

The results obtained are shown in the table. This table gives the duration of the oxidation (minutes), the electric surface resistance (ohms per cm.), and the amount of polyamide (percent by weight) which was dissolved with respect to the original weight.

| Time (min.): | Surface resistance (LΩcm.) | Polyamide dissolved (percent by weight) |
|---|---|---|
| 0 | $10^{12.9}$ | |
| 10 | $10^{12.5}$ | |
| 25 | $10^{11.4}$ | |
| 40 | $10^{10.8}$ | |
| 60 | $10^{10.7}$ | 0.4 |
| 90 | $10^{10.7}$ | 2.5 |
| 120 | $10^{10.6}$ | 7.8 |
| 150 | $10^{10.6}$ | 14.3 |
| 180 | $10^{10.5}$ | 19.8 |

EXAMPLE III

Using the procedure described in Example II, 20 g. of the polyamide was immersed in the hydrogen peroxide solution in the form of a filament (diameter 0.2 mm.). After 1 hour 0.5% by weight of the polyamide had gone into solution. The filament developed hydrophilic properties.

What is claimed is:
1. Process for the preparation of film and filament-forming polyamide-sulphoxides substantially free of sulphone groups, wherein the sulphur atoms in a polyamide composed of monomer units having the formula

$$\{NH-CO-(CH_2)_2-S-(CH_2)_3\}$$

are oxidized with an aqueous solution consisting essentially of hydrogen peroxide and water at a temperature of from 10° C. to 30° C.

2. Process of claim 1 wherein the aqueous solution of hydrogen peroxide contains 2–40 percent by weight hydrogen peroxide.

3. Process of claim 1, wherein about 5–45 percent of the sulphur atoms in the polyamide are oxidized to sulphoxide groups, the other sulphur atoms remaining unoxidized.

4. A process for reducing the static charge on the surface of articles composed of film and filament-forming polyamides wherein the monomer units have the formula [—NH—CO—(CH₂)₂—S—(CH₂)₃—] which comprises oxidizing the sulphur atoms with an aqueous solution of hydrogen peroxide at a temperature of 10–30° C.

5. Film and filament-forming polyamide-sulphoxides wherein the monomer units of the polyamides have the formula

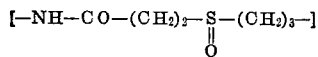

6. Film and filament-forming polymers wherein about 5–45 percent of the recurring units contained therein have the formula

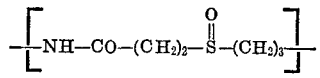

with the remaining recurring units having the formula $\{NH-CO-(CH_2)_2-S-(CH_2)_3\}$.

References Cited

UNITED STATES PATENTS

| 2,462,430 | 2/1949 | Schneider | 260—78 X |
| 2,720,441 | 10/1955 | Wallace | 260—78 X |
| 3,294,755 | 12/1966 | Tanner | 260—78 |

FOREIGN PATENTS

| 670,177 | 4/1952 | Great Britain | 260—78 |

HOWARD E. SCHAIN, Primary Examiner

U.S. Cl. X.R.

8—115.5; 260—78 SC, 857